United States Patent [19]

Kanuma

[11] 4,441,158
[45] Apr. 3, 1984

[54] ARITHMETIC OPERATION CIRCUIT

[75] Inventor: Akira Kanuma, Palo Alto, Calif.

[73] Assignee: Tokyo Shibaura Denki Kabushiki Kaisha, Japan

[21] Appl. No.: 285,980

[22] Filed: Jul. 23, 1981

[30] Foreign Application Priority Data

Jul. 31, 1980 [JP] Japan ................. 55-105749

[51] Int. Cl.$^3$ ........................ G06F 7/52; G05F 7/50
[52] U.S. Cl. ................... 364/758; 364/757; 364/764; 364/786; 364/787
[58] Field of Search ............ 364/757, 758, 764, 786, 364/787

[56] References Cited

U.S. PATENT DOCUMENTS

| | | | |
|---|---|---|---|
| 3,535,498 | 10/1970 | Smith, Jr. | 364/757 X |
| 3,535,502 | 10/1970 | Clapper | 364/786 X |
| 4,153,938 | 5/1979 | Ghest et al. | 364/757 X |
| 4,168,530 | 9/1979 | Gajski et al. | 364/757 X |

OTHER PUBLICATIONS

Agrawal, High-Speed Arithmetic Arrays, IEEE Transaction on Computers 215, vol. c-28, No. 3 (Mar. 1979).

*Primary Examiner*—Jerry Smith
*Assistant Examiner*—John R. Lastova
*Attorney, Agent, or Firm*—Finnegan, Henderson, Farabow, Garrett & Dunner

[57] ABSTRACT

There is disclosed an arithmetic operation circuit including an adder for performing a multiplication and a division. A one stage arithmetic cell group is formed by connecting eight arithmetic cells. Eight stage arithmetic cell groups are set in the obliquely shifted arrangement and a ninth arithmetic cell group is provided corresponding to the shifts of their arithmetic cell groups in the array. A partial carry circuit is connected to the respective arithmetic cell groups. The arithmetic cells are all comprised of complementary MOS gates and the carry circuit is comprised of enhancement/depletion type MOS gates.

7 Claims, 11 Drawing Figures

ARITHMETIC OPERATION CIRCUIT

BACKGROUND OF THE INVENTION

The present invention relates to an arithmetic operation circuit containing a plurality of arithmetic cells which is fabricated in an integrated manner.

In a prior art arithmetic operation circuit, e.g. a multiplication and division circuit for performing a multiplication and a division described by D. P. Agrawal "High-Speed Arithmetic Arrays", IEEE trans. Comput. vol. C-28, No. 3, March 1979, pages 214–224, arithmetic cells within the multiplication/division circuit include only adders. In the circuit, a subtracting process in a division is a twos-complement adding operation. Therefore, Agrawal's multiplication/division circuit described in IEEE has an advantage in that power consumption is low and an operation delay time is small, compared with a multiplication/division circuit of which the arithmetic cells each comprise an adder and a subtractor. In Agrawal's circuit, a carry process is performed by a so-called restoring technique. Therefore, time taken for the carry process is short and an arithmetic operation is performed at high speed and high precision.

In the arithmetic operation circuit described in Agrawal, however, when binary numbers of 16 bits are multiplied by each other or a binary number of 31 bits (dividend) is divided by a binary number of 16 bits (divisor), 271 arithmetic cells are required to be arranged in a repetitive fashion. Each of the arithmetic cells includes 18 MOS gates. Therefore, the arithmetic operation circuit includes totally 4,878 MOS gates.

Assume that those MOS gates are enhancement/depletion type MOS gates (E/D type MOS gates), and that half of the whole gates are equivalently held in an ON state for calculating the power consumption of the arithmetic operation circuit when it is executing an ordinary operation. On this assumption, current flowing through a single gate is approximately 0.1 mA. Accordingly, the total current consumed by the arithmetic operation circuit is increased up to approximately 244 mA, resulting in an increase of the power consumption in the arithmetic operation circuit. This leads to an undesirable phenomenon, e.g., increase of the heat generated in the operation. The increase of the heat makes it difficult to integrate the arithmetic operation circuit also containing a peripheral circuit such as resistors and a control circuit into a substrate of one chip.

Conversely, when all the gates in Agrawal's arithmetic operation circuit are not the E/D type MOS gates but are complementary type MOS gates (CMOS gates), the total of the power consumption is reduced. The subjective characteristic of the C-MOS gate, however, brings about decrease of the operation speed, increase of the carry operation time, and hence increases the time required for the whole arithmetic operation. Furthermore, a degree of integration of the circuit is reduced, so that an area of one chip substrate increases.

SUMMARY OF THE INVENTION

Accordingly, an object of the present invention is to provide an arithmetic operation circuit with a high degree of integration which is capable of performing an arithmetic operation at a high speed but with extremely small power consumption.

According to the present invention, there is provided an arithmetic operation circuit having at least one stage of an arithmetic cell group comprising a plurality of arithmetic cells connected in a cascade fashion and oriented in a given direction, and a carry circuit. The arithmetic cell comprising an adder has at least a carry signal output terminal and gates comprising complementary MOS transistors. The carry circuit is connected to carry signal output terminals of a given number of arithmetic cells in the arithmetic circuit group, and has a gate comprising enhancement/depletion type MOS transistors.

The present invention can be more fully understood from the following detailed description when taken in conjunction with the accompanying drawings, in which:

DETAILED DESCRIPTION OF THE PREFERRED EMBODIMENTS

Figure 1:
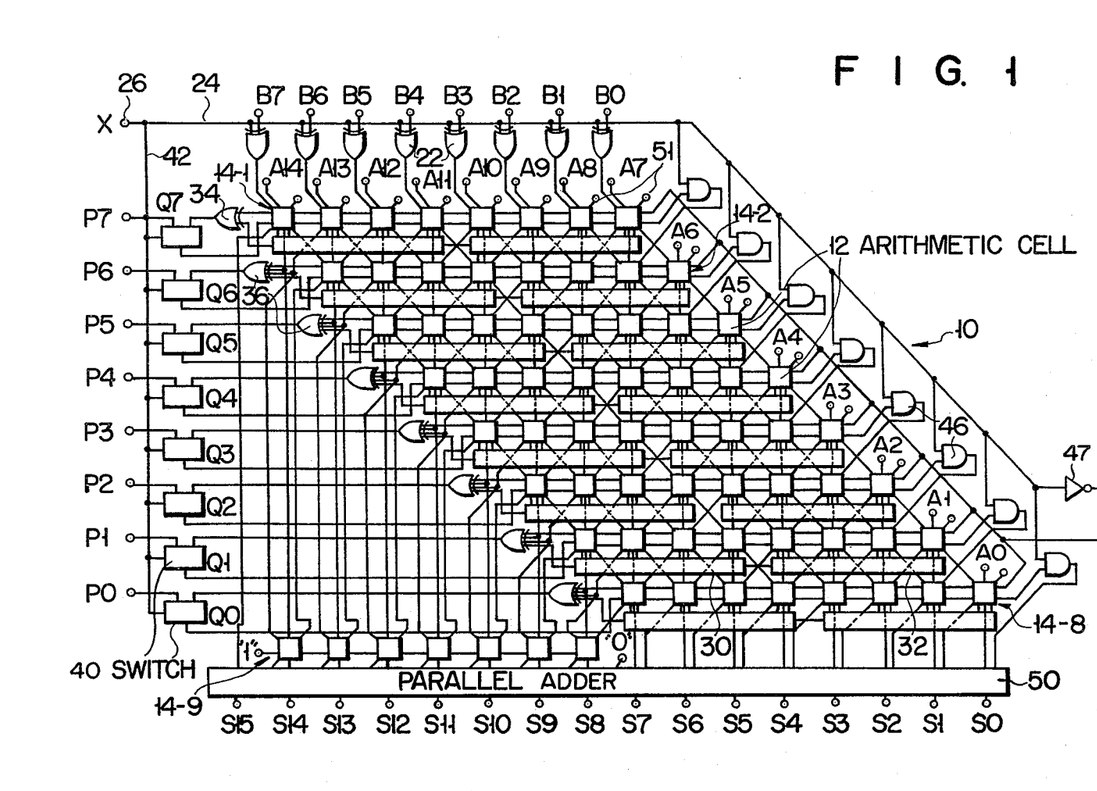
FIG. 1 illustrates, by way of block and schematic diagram, an overall multiplication/division circuit which is an embodiment according to the present invention.

Referring now to FIG. 1, there is shown a multiplication/division (M/D) circuit 10 as a preferred embodiment of an arithmetic operation circuit according to the present invention. The M/D circuit 10 multiplies a binary number P (multiplicand) of given number of bits, 8 bits, for example, by a binary number B (multiplier) of 8 bits, thereby producing the product represented by a 16-bit binary number S. The M/D circuit 10 also divides a 15-bit binary number A (dividend) by an 8-bit binary number B (divisor), thereby producing a quotient of an 8-bit binary number Q and a remainder of the 16-bit binary number S. Those binary numbers P, B, S and A are defined as follows:

$$P = (P_7, P_6, \ldots, P_0) \quad (1)$$

-continued $$= 2^7 \cdot P_7 + 2^6 \cdot P_6 + \ldots + 2^0 \cdot P_0$$

$$B = (B_7, B_6, \ldots, B_0) \quad (2)$$

$$= 2^7 \cdot B_7 + 2^6 \cdot B_6 + \ldots + 2^0 \cdot B_0$$

$$S = (S_{15}, S_{14}, \ldots, S_0) \quad (3)$$

$$= 2^{15} \cdot S_{15} + 2^{14} \cdot S_{14} + \ldots + 2^0 \cdot S_0$$

$$A = (A_{14}, A_{13}, \ldots, A_0) \quad (4)$$

$$= 2^{14} \cdot A_{14} + 2^{13} \cdot A_{13} + \ldots + 2^0 \cdot A_0$$

By the definition, the product of the binary numbers P and B, the quotient of the binary numbers A and B and the remainder are tabulated as in table I.

TABLE 1

| Arithmetic operation | Mode | Function |
|---|---|---|
| Multiplication | X = 0 | $P_7 P_6 \ldots P_0$ <br> $\times) B_7 B_6 \ldots B_0$ <br> $S_{15}S_{14}S_{13}S_{12}S_{11}S_{10}S_9S_8S_7S_6 \ldots S_0$ |
| Division | X = 1 | When $A = (A_{14}, A_{13}, \ldots, A_0) = 0$ <br> $A_{14}A_{13}A_{12}A_{11}A_{10}A_9A_8A_7A_6 \ldots A_0$ <br> $\div) B_7 B_6 \ldots B_0$ <br> $Q_7 Q_6 \ldots Q_0$ (Quotient) <br> $S_{15}S_{14}S_{13}S_{12}S_{11}S_{10}S_9S_8S_7S_6 \ldots S_0$ (Remainder) |

In the table 1, a symbol X indicates a control signal or an arithmetic operation mode designating signal to be described later. The signal X designates a multiplication mode or a division mode in the M/D circuit 10.

The M/D circuit shown in FIG. 1 has an array of a plurality of, for example, 71 arithmetic cells 12. In the array, eight arithmetic cells 12 are arranged in a row direction thereby forming a first stage arithmetic cell group 14-1. A second stage arithmetic cell group 14-2 is likewise comprised of eight arithmetic cells 12 and is shifted down and to the row direction by a space corresponding to a single arithmetic cell with respect to the first stage arithmetic cell group. Similarly, the subsequent stages arithmetic cell groups are each shifted down and to the row direction by the same space with respect to the preceding ones. In this way, eight arithmetic unit groups 14-1, 14-2, ..., 14-8 are set in the obliquely shifted arrangement. Not only the arithmetic cells 12 arranged in a row direction but also the arithmetic cells arranged in a column direction are electrically connected to one another for the data transfer. The remaining seven arithmetic cells 12 corresponding to the number of the shifts for the eight arithmetic cell groups 14-1 to 14-8 are connected to form a ninth stage arithmetic cell group 14-9. In other words, all cells described above are wired in accordance with a wiring of a called carry-save technique.

Figure 2:
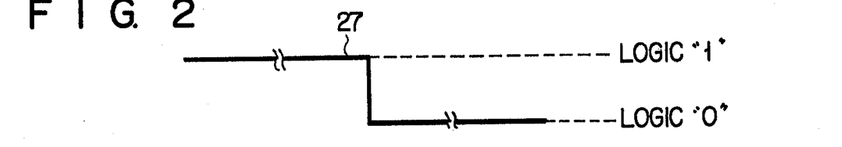
FIG. 2 is a waveform of a signal for designating an arithmetic operation mode applied to the multiplication/division circuit shown in FIG. 1.

Input terminals of the arithmetic cells in the first arithmetic cell group 14-1 are connected to output terminals of eight 2-input exclusive OR networks 22, respectively. Input terminals of the exclusive OR networks (referred to as EX-OR networks) 22 are connected to a first signal line 24 which is connected to a signal input terminal 26 to which the arithmetic operation mode designating signal X is applied. The arithmetic operation mode designating signal X has a digital waveform 27 changing between two voltage levels corresponding to a logical "1" and a logical "0", as shown in FIG. 2.

Applied to the other input terminals of the 2-input EX-OR networks 22 are eight numerical data $B_7, B_6, \ldots, B_0$ cooperatively making up the binary number B given by the equation (2). Carry output terminals of upper four arithmetic cells of each of the 1st to 8th arithmetic cell groups 14-1, 14-2, ..., 14-8 are respectively connected to an upper carry circuit 30. Similarly, the lower arithmetic cells of each stage are connected to a lower carry circuit 32 connected in cascade fashion to the upper carry circuit 30. Carry operation in the division processing in each arithmetic cell group is performed by the upper and lower circuits 30 and 32.

The arithmetic cell corresponding to the most significant bit in the first stage arithmetic cell group 14-1 is connected to an input terminal of another 2-input EX-OR network 34. The other input terminal of the 2-input EX-OR network 34 is connected to the output terminal of the upper carry circuit 30. The most significant arithmetic cells of the 2nd to 8th arithmetic cell groups are connected to first input terminals of seven 4-input EX-OR networks 36, respectively. A second input terminal of the 4-input EX-OR network connected to the most significant arithmetic cell of the p-th (p=2, 3, ..., 8) arithmetic cell group is connected to the most significant arithmetic cell of the (p−1)th arithmetic cell group and to the arithmetic cell located at the (p−1)th bit of the 9th arithmetic cell group 14-9 counted from the most significant bit. A third input terminal of the 4-input EX-OR network connected to the most signicant arithmetic cell of the p-th arithmetic cell group is connected to the arithmetic cell located at the second of the (p−1)th stage arithmetic cell group counted from the most significant and connected to the arithmetic cell located at the (p−1)th bit of the 9th arithmetic cell group 14-9 counted from the most significant group. The fourth input terminal of the 4-input EX-OR network 36 of the p-th stage is connected to the output terminal of the upper carry circuit 30 of the same stage (the p-th), respectively.

Output terminals of the 2-input EX-OR network 34 of the first stage arithmetic cell group and the 4-input EX-OR networks 36 of the second to eighth stage arithmetic cell groups are connected to eight switch circuits 40, respectively. Eight numerical data $P_7, P_6, \ldots, P_0$ constituting the binary number P expressed by the equation (1) are applied to input terminals of the switch circuits 40, respectively. The other input terminals of the switch circuits 40 are directly connected to a second signal line 42 which is further connected to the first signal line 24, and therefore are supplied with the arithmetic mode designating signal X. With this connection, data $P_7, P_6, \ldots, P_0$ cooperatively forming the binary number P as the muliplier in the multiplication are respectively supplied to the first to eighth arithmetic cell groups 14-1 to 14-8, through switch circuits 40.

Terminals of the arithmetic cells 12 at the least significant bits of the first to eighth arithmetic cell groups 14-1 to 14-8 are respectively connected to first input terminals of 2-input AND networks (referred to as AND networks). Other terminals of above-mentioned cells are connected through an inverter 47 to the first signal line 24. Second input terminals of each of the AND networks 46 is directly connected to the first signal line 24. Generally, an output terminal of the q-th AND network (q=1, 2, ..., 8) is directly connected to the second arithmetic cell counted from the least significant cell in the (q+1)th arithmetic cell group.

The fifteen bit data $A_{14}, A_{13}, \ldots, A_0$ expressed by the equation (4), constituting the binary number A as the dividend, are supplied to the seven arithmetic cells of the first stage arithmetic cell group 14-1 and the seven cells located at the least significant bits in the second to eighth arithmetic cells 14-2 to 14-8. The most significant cell of the first stage arithmetic cell group, the seven cells of the ninth stage arithmetic cell group 14-9, and the eight stage arithmetic cells of the group 14-9, and the eight stage arithmetic cells of the eighth arithmetic cell group 14-8 are connected in parallel to a 16-bit parallel adder 50, for example. With this connection, the operated data successively obtained through the first to eighth stage arithmetic cell groups 14-1 to 14-8 are outputted as sixteen numerical data $S_{15}, S_{14}, \ldots, S_0$ forming the binary number S given by the equation (3), through the parallel adder 50.

As described above, a couple of the upper carry circuit 30 and the lower carry circuit 32 connected in a cascade fashion are provided for each of the first to eighth stage arithmetic cell groups 14-1 to 14-8. An output from the first upper carry circuit 30 and an output from the cell at the most significant bit of the first arithmetic cell group 14-1 are logically operated by the 2-input EX-OR network 34 and the result of the operation is transferred to the first switch circuit 40. An output from the upper carry circuit 30 for each of the second to eighth stage arithmetic cell groups 14-2, ..., 14-8 is transmitted to one of the input terminals of the corresponding 4-input EX-OR network 36. Output data from the 4-input EX-OR networks 36 are supplied to the corresponding switch circuits 40, respectively. The carry output signals are inputted from those switch circuits 40 to arithmetic cell groups, respectively.

The first to eighth stage cell groups 14-1, 14-2, ..., 14-8 supplied with the above-mentioned carry signals perform carry signal processing and arithmetic operation. The operation of each cell is controlled by the output carry output signals, whereby the 15-bit binary data, namely the binary data $(A_{14}, A_{13}, \ldots, A_7)$ inputted into the arithmetic cells 12 of the first stage cell group 14-1 and the other binary data $(A_6, A_5, \ldots, A_0)$ inputted into the least significant bits of the second to eighth stage cell groups 14-2, ..., 14-8, are divided by the 8-bit binary data, or the divisor data $(B_7, B_6, \ldots, B_0)$, also inputted into the first arithmetic cell group 14-1 by way of the 2-input EX-OR network 22. A quotient as the result of the operation is produced as 8-bit binary data $Q_7, Q_6, \ldots, Q_0$ from the output terminal of the 2-input EX-OR network 34 and the outputs of the 4-input EX-OR networks 36. The remainder of 16-bit binary data $S_{15}, S_{14}, \ldots, S_0$ are produced from the 16-bit parallel adder 50.

Incidentally, the 2-input EX-OR networks 22, the switch circuits 40 and the 2-input AND networks 46 are controlled by the arithmetic operation mode designating signal X. A logical "0" level signal is applied to the eight cells of the first cell arithmetic group and input terminals 51 (terminals to which input data $C_i$ presented below is applied in FIG. 3) of the least significant cells of the second to eighth stage arithmetic cell groups.

Figure 3:
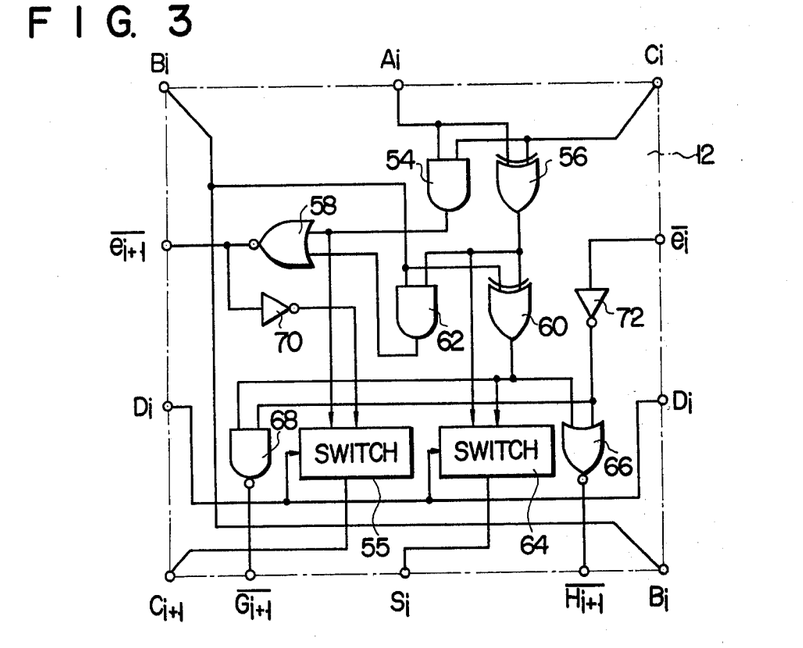
FIG. 3 is a circuit diagram of one of arithmetic cells used in the multiplication/division circuit shown in FIG. 1.

Turning now to FIG. 3, there is shown a circuit diagram of one of the plurality of arithmetic cells 12 shown in FIG. 1. The arithmetic cell 12 is so arranged as to perform a logical operation of the bit data of i-th digit. The cell 12 receives five bits of data $A_i, B_i, C_i, D_i$ and $\overline{e_i}$ and produces seven bits of data $B_i, D_i, C_{i+1}, \overline{G_{i+1}}, \overline{H_{i+1}}$ and $\overline{e_{i+1}}$. The output data are subjected to logical operations given by the following equations.

$$e_{i+1} = A_i \cdot C_i + B_i \cdot (A_i \oplus C_i) \tag{5}$$

$$C_{i+1} = A_i \cdot C_i + (A_i \oplus C_i) \cdot B_i \cdot D_i \tag{6}$$

$$S_i = A_i \oplus C_i \oplus (B_i \cdot D_i) \tag{7}$$

$$G_{i+1} = e_i \cdot (A_i \oplus B_i \oplus C_i) \tag{8}$$

$$H_{i+1} = e_i + (A_i \oplus B_i \oplus C_i) \tag{9}$$

In the above equation, a symbol $\oplus$ designates an exclusive OR operation.

The arithmetic cell 12 shown in FIG. 3 includes a first 2-input AND network 54 which receives at the input terminals bit data $A_i$ and $C_i$ of the i-th digit. A first 2-input EX-OR network 56 is connected in parallel with the first AND network 54. An output terminal of the first AND network 54 is connected to one of the input terminals of a first 2-input NOR network 58 and to a switch circuit section 55. An output terminal of the first EX-OR network 56 is connected to one input terminal of a second 2-input EX-OR network 60, one of input terminals of a second AND network 62, and a second switch circuit section 64. Bit data $B_i$ of the i-th digit is supplied to the other input terminals of the second EX-OR network 60 and the second AND network 62.

The output terminal of the second EX-OR network 60 is connected to one of the input terminals of a second NOR network 66, the second switch section 64, and one of the input terminals of a NAND network 68. An output terminal of the second AND network 62 is directly connected to the other input terminal of the first NOR network 58. The output terminal from the first NOR network 58, which produces the bit data $e_{i+1}$, is connected through a first inverter 70 to the first switch circuit section 55. Bit data $e_i$ of the i-th digit is supplied to the other input terminal of the second NOR network 66 and the other input terminal of the NAND network 68, through a second inverter 72. The bit data $\overline{H_{i+1}}$ and $\overline{G_{i+1}}$ are produced from the output terminals of the second NOR network 66 and the NAND network 68, respectively. The bit data $D_i$ is also applied to the first and second switch circuits 55 and 64 of which the outputs provide bit data $C_{i+1}$ and $S_i$, respectively. In other words, the arithmetic cell 12 shown in FIG. 3 is comprised of an adder made up of the 2-input AND networks 54, 62, the 2-input EX-OR networks 56 and 60, the 2-input NOR networks 58 and 66, 2-input NAND network 68, the inverters 70 and 72, and the switch sections 55 and 64.

Figure 4:
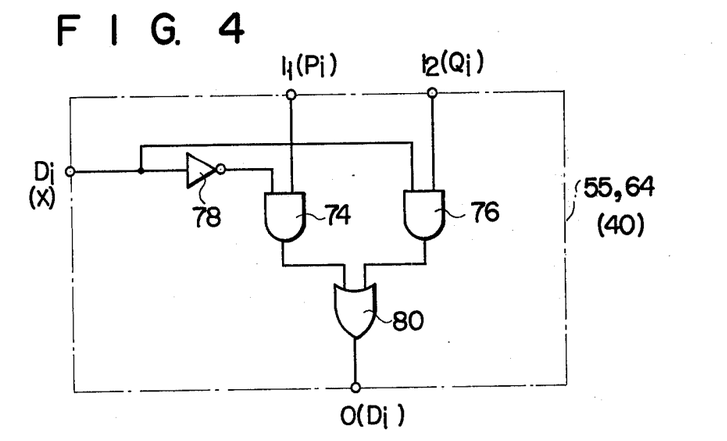
FIG. 4 is a circuit diagram of a switch circuit provided in the multiplication/division circuit in FIG. 1 or a switch circuit provided in the arithmetic cell shown in FIG. 3.

One of the switch circuits 40 shown in FIG. 1, and the first and second switch circuit sections 55 and 64 provided within the arithmetic cell 12 shown in FIG. 3 each contain two 2-input AND networks 74 and 76 as shown in FIG. 4. Control data $D_i$ of the i-th digit is supplied through an inverter 78 to one of the input terminals of the AND network 74, and also to one of the input terminals of the AND network 76. The output terminals of the AND networks 74 and 76 are coupled with the two input terminals of an OR network 80, respectively. Accordingly, output data O is obtained which is defined by the following relation $$O = I_1 \cdot \overline{D_i} + I_2 \cdot D_i \tag{10}$$

where $I_1$ and $I_2$ are input data applied to the switch circuit. $I_1$ and $I_2$ are also used to designate input terminals of the switch circuit which receive the input data designated by the same. The switch circuit 40 shown in FIG. 1, since it has the same construction as the above-mentioned circuit sections 55 and 64, when it receives input data $P_i$ and $D_i$, produces output data given by equation (11):

$$D_i = P_i \cdot \overline{X} + Q_i \cdot X \qquad (11)$$

where X is the arithmetic operation mode signal.

In the arithmetic cell 12 thus constructed according to FIGS. 3 and 4, the first AND network 54 logically operates the data $A_i$ and $C_i$ to produce "$A_i \cdot C_i$". The "$A_i \cdot C_i$" is supplied to the NOR network 58 and the data input terminal $I_1$ of the first switch circuit section 55. The data $A_i$ and $C_i$ are also logically operated by the first EX-OR network 56, to be "$A_i \oplus C_i$". The output data "$A_i \oplus C_i$" from the EX-OR network 56 is supplied to the second EX-OR network 60, the second AND network 62, and the data input terminal $I_1$ of the second switch circuit section 64. The second AND network 62 logically operates the input data $B_i$ and the output data of the first EX-OR network 56 to produce a logical product "$B_i \cdot (A_i + C_i)$" which in turn is fed to the first NOR network 58.

The first NOR network 58 logically produces the output data from the first AND network 54 and the output data from the second AND network 62 to produce $\overline{A_i \cdot C_i + B_i \cdot (A_i + C_i)}$ which in turn is produced as $\overline{e_{i+1}}$ which is one of the output data from the cell 12. At the same time, the output data $\overline{e_{i+1}}$ is inverted by the inverter 70 and then transmitted to the input terminal $I_2$ of the first switch circuit section 55. The first switch circuit section 55 logically operates the output data $\overline{e_{i+1}}$ and the output data from the first AND network 54 to produce "$A_i \cdot C_i \cdot \overline{D_i} + [A_i \cdot C_i + B_i \cdot (A_i \oplus C_i)] \cdot D_i$" as one of the output data from the cell 12. The second EX-OR network 60 logically processes the output data from the first EX-OR network 56 and the i-th digit input data $B_i$ to produce "$A_i \oplus B_i \oplus C_i$" which in turn is applied to the second NOR network 66, the NAND network 68 and the input terminal $I_2$ of the second switch circuit section 64.

Upon receipt of the data "$A_i \oplus B_i \oplus C_i$" and the data from the first EX-OR network 56, the second switch section 64 produces "$(A_i \oplus C_i) \cdot \overline{D_i} + (A_i \oplus B_i \oplus C_i) \cdot D_i$" as one $S_i$ of the output data from the cell 12. The input data $\overline{e_i}$ is applied through the inverter 72 to input terminals of the second NOR network 66 and NAND network 68. Accordingly, the second NOR network 66 produces a logical value $\overline{(A_i \oplus B_i \oplus C_i) + e_i}$ as output data $H_{i+1}$. The NAND network 68 produces a logical value "$\overline{(A_i \oplus B_i \oplus C_i) \cdot e_i}$" as output data $G_{i+1}$. It will be understood that the output data thus operated and produced from the arithmetic cell 12 satisfy the logical conditions given by the equations (5) to (9).

Figure 5:
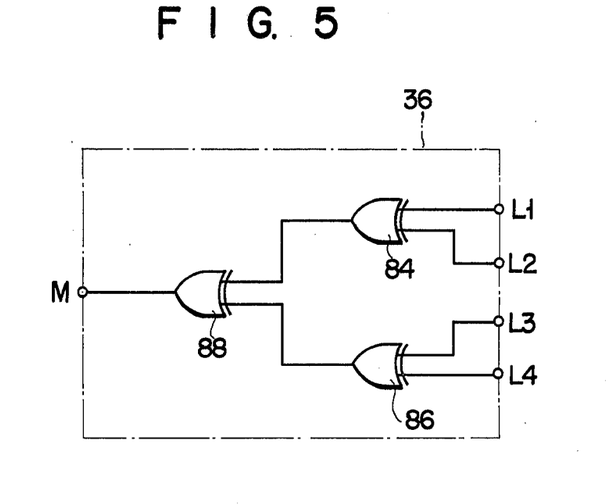
FIG. 5 is a circuit diagram of one of 4-input exclusive OR networks provided in the circuit shown in FIG. 1.

One of the 4-input EX-OR circuits 36 provided within the multiplication/division circuit 10 includes three 2-input EX-OR networks 84, 86 and 88, as shown in FIG. 5. Of the four input data $L_1$ to $L_4$, two input data $L_1$ and $L_2$ are supplied to input terminals of an EX-OR network 84. The remaining input data $L_3$ and $L_4$ are supplied to input terminals of the EX-OR network 86.

Output terminals of the EX-OR networks 84 and 86 are connected to input terminals of the EX-OR network 88. Of those four input data $L_1$ to $L_4$, the two input data $L_1$ and $L_2$ are logically operated by the EX-OR network 84 to be transformed into a logical value "$L_1 \oplus L_2$". The logical value "$L_1 \oplus L_2$" is transmitted to one of the input terminals of the EX-OR network 88. The remaining input data $L_3$ and $L_4$ are logically operated by the EX-OR network 86 to be transformed into a logical value "$L_3 \oplus L_4$" which in turn is led to the other input terminal of the EX-OR network 88. Accordingly, the EX-OR network 88 produces output data M given by the following equation $$M = (L_1 \oplus L_2) \oplus (L_3 \oplus L_4) = L_1 \oplus L_2 \oplus L_3 \oplus L_4 \qquad (12)$$

Figure 6:
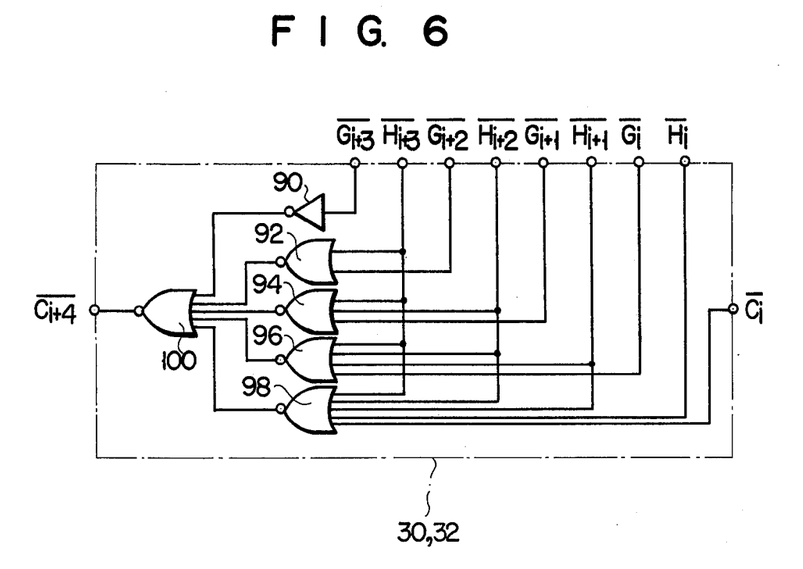
FIG. 6 is a circuit diagram of a carry skip circuit provided in the multiplication/division circuit shown in FIG. 1.

The carry circuits 30 and 32 shown in FIG. 1 each contain an inverter 90 and five NOR networks 92, 94, 96, 98 and 100 as shown in FIG. 6. Input data $\overline{G_{i+3}}$ is applied to a first input terminal of the 5-input NOR network 100 after it is inverted by the inverter 90. Input data $H_{i+3}$ and $G_{i+2}$ are logically operated by the NOR network 92 to be a logical value "$\overline{H_{i+1} + G_{i+2}}$", or "$\overline{H_{i+1} \cdot G_{i+2}}$", which is then transmitted to the second input terminal of the 5-input NOR network 100. The input data $\overline{H_{i+3}}$ and the input data $\overline{H_{i+2}}$ and $\overline{G_{i+1}}$ are inputted into the input terminals of the NOR network 94 which produces a logical value "$H_{i+3} \cdot H_{i+2} \cdot G_{i+1}$" from the output terminal. The logical value "$H_{i+3} \cdot H_{i+2} \cdot G_{i+1}$" is led to the third input terminal of the 5-input NOR network 100. The input data $\overline{H_{i+2}}$ and $\overline{H_{i+2}}$ and input data $\overline{H_{i+1}}$ and $\overline{G_i}$ are inputted together to the NOR network 96 which produces from the output terminal a logical value "$H_{i+3} \cdot H_{i+2} \cdot H_{i+1} \cdot G_i$" which is supplied to a fourth input terminal of the NOR network 100. Similarly, the data $\overline{H_{i+3}}$, $\overline{H_{i+2}}$, $\overline{H_{i+1}}$ and input data $\overline{H_i}$, $\overline{C_i}$ are inputted to the NOR network 98 which then produces a logical value "$H_{i+3} \cdot H_{i+2} \cdot H_{i+1} \cdot H_i \cdot C_i$". The logical value is then transferred to a fifth input terminal of the 5-input NOR network 100. The 5-input NOR network 100 operates the five exclusive NORed value to provide carry output data $\overline{C_{i+4}}$.

Figure 7:
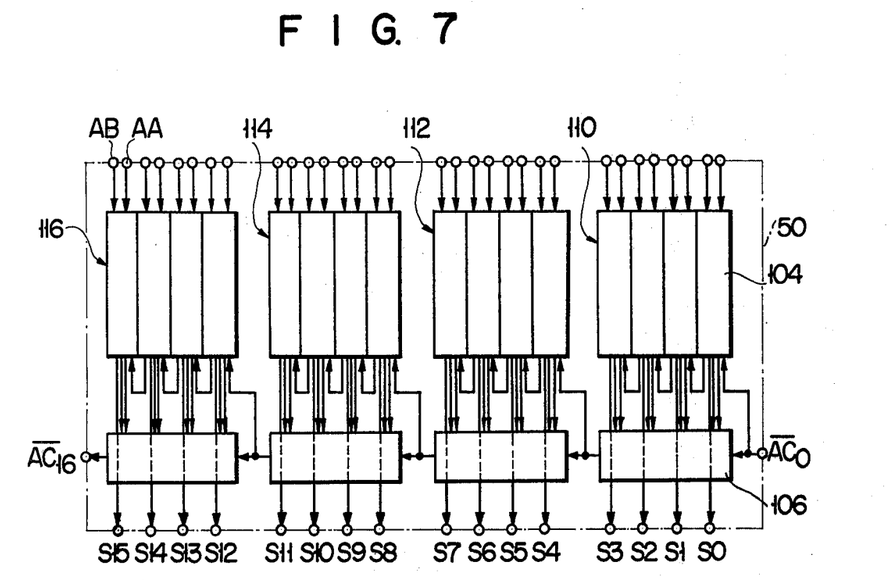
FIG. 7 is a block diagram of a parallel adding circuit used in the multiplication/division circuit shown in FIG. 1.

The parallel adding circuit 50 of the M/D circuit 10 of FIG. 1 is shown in FIG. 7. The parallel adder 50 contains a plurality of adders 104 arranged in parallel and a plurality of carry circuits 106 connected to those adders 104, as shown in FIG. 7. The carry circuit 106 has the same construction as each carry circuit 30 and 32 and therefore no detailed explanation of the carry circuit 106 will be given. A given number of adders, for example four, are arranged in parallel to form a first adder group 110. Further, second to fourth adder groups each with the same construction as the first adder group are arranged in parallel. The four carry circuits 106 are connected to the first to fourth adder groups 110, 112, 114 and 116, respectively. Those carry circuits 106 are connected in a cascade fashion, so that a carry output is successively transmitted to the upper carry circuits, while being supplied to the corresponding upper adder circuits.

Figure 8:
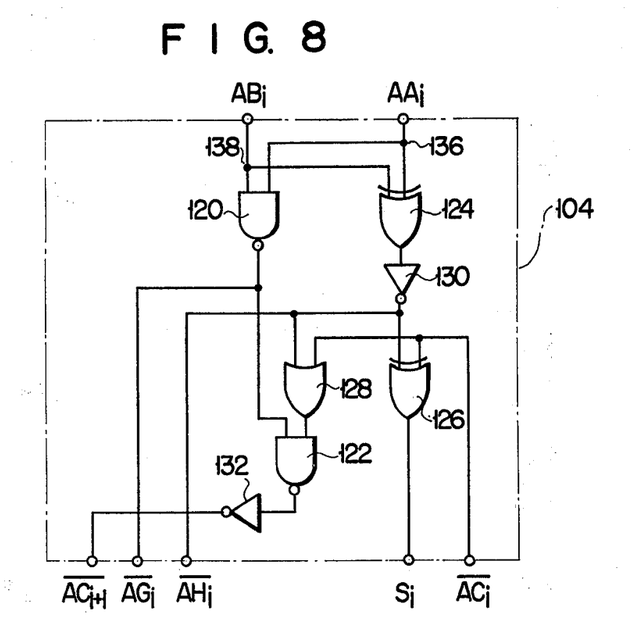
FIG. 8 is a circuit diagram of one of adders provided in the parallel adding circuit shown in FIG. 7.

One of the adders 104 of the i-th digit to which those carry outputs and the arithmetic cells of the respective bits (FIG. 1) are supplied is comprised of a couple of 2-input NAND networks 120 and 122, a couple of 2-input EX-OR networks 124 and 126, an OR network 128 and two inverters 130 and 132, as shown in FIG. 8. In the adder, the first NAND network 120 and the first EX-OR network 124 are connected in parallel to each other. Input data $AA_i$ of the i-th digit is supplied to a common connection point 136 of input terminals of the NAND network 120 and the EX-OR network 124. Another input data $AB_i$ is transferred to a common connection point 138 of the other input terminals of the NAND network 120 and the EX-OR network 124. An output terminal of the first NAND network 120 is connected directly to one of the input terminals of the second NAND network 122 and also to a data output terminal of the adder. The output terminal of the first EX-OR network 124 is connected to an input of the first inverter 130. The output terminal of the first inverter 130 is connected to one of the input terminals of the second EX-OR network 126, one of the input terminals of the OR network 128, and a data output terminal of the adder 104. The other input terminals of the second EX-OR network 126 and the OR network 128 are commonly connected to each other and to a data input terminal of the adder 104.

The output of the second EX-OR network 126 is directly connected to a data output terminal. An output terminal of the OR network 128 is connected to the other input terminal of the second NAND network 122 of which the output terminal is connected to a data output terminal of the adder 104, through the second inverter 132. Accordingly, the input data $AA_i$ and $AB_i$ of the i-th digit are logically operated by the first NAND network 120, so that the first NAND network 120 produces a logic value "$\overline{AA_i \cdot AB_i}$" as output data $\overline{AG_i}$. Simultaneously, the input data $AA_i$ and $AB_i$ are operated by the first EX-OR network 124 and "$AA_i \oplus AB_i$" is produced from the network 124. The logic data "$AA_i \oplus AB_i$" is inverted by the first inverter 130 and logic data "$\overline{AA_i \oplus AB_i}$" is produced as the output data $\overline{AH_i}$.

The output from the first inverter 130 and the carry signal $AC_i$ of the i-th digit are operated by the second EX-OR network 126, whereby to obtain logic data "$AB_i \oplus AA_i \oplus AC_i$" which is produced as output data $S_i$ from the adder 104. The OR network 128 and the second NAND network 122 cooperatively provide "$\overline{[(AB_i \oplus AA_i) + AC_i] \cdot (AA_i \cdot AB_i)}$" which is further inverted by the second inverter 132, thus carry signal $\overline{AC_{i+1}}$ is generated. In other words, the carry signal $AC_{i+1}$ is obtained by the following equation (13)

$$\overline{AC_{i+1}} = \overline{AA_i \cdot AB_i + AB_i \cdot AC_i + AC_i \cdot AA_i} \quad (13)$$

The 16-bit parallel adder 50 thus constructed produces the binary number $S=(S_{15}, S_{14}, \ldots, S_0)$ as the product of the multiplication or the binary number $S=(S_{15}, S_{14}, \ldots, S_0)$ as a remainder related to a quotient as the result of division.

Figure 9:
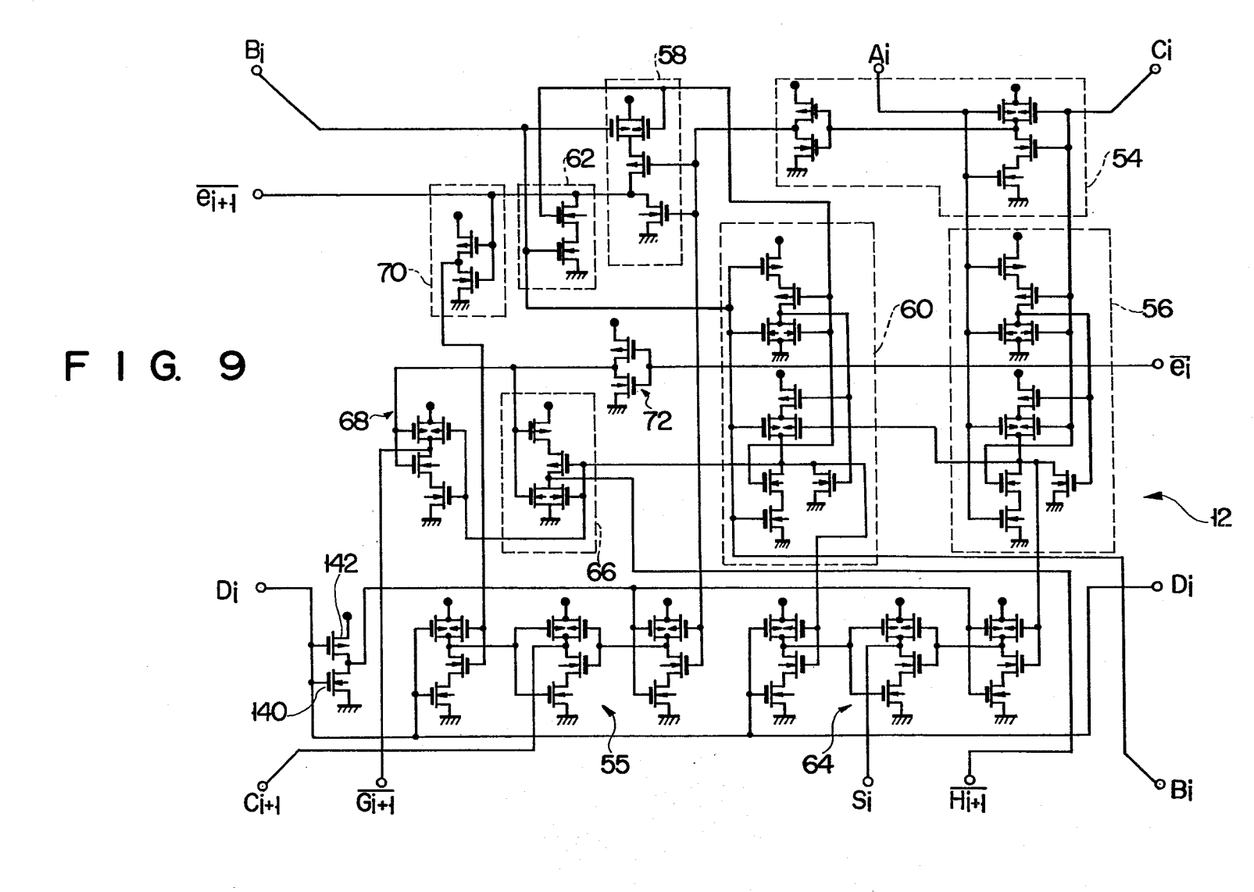
FIG. 9 is a circuit diagram of a detail of the arithmetic cell which is shown in FIG. 3 and is comprised of CMOS gates.
Figure 10:
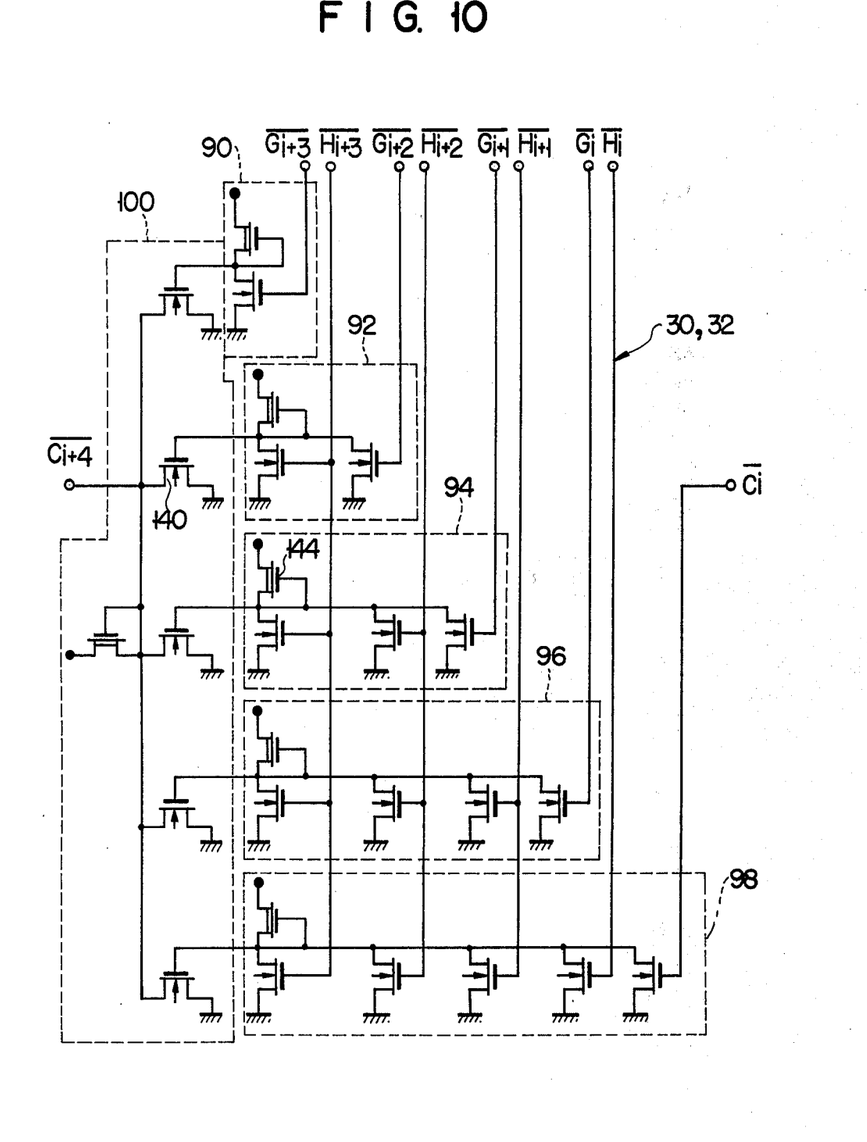
FIG. 10 shows a circuit diagram of a detail of the carry circuit which is shown in FIG. 6 and is comprised of enhancement/depletion type MOS gates.
Figure 11:
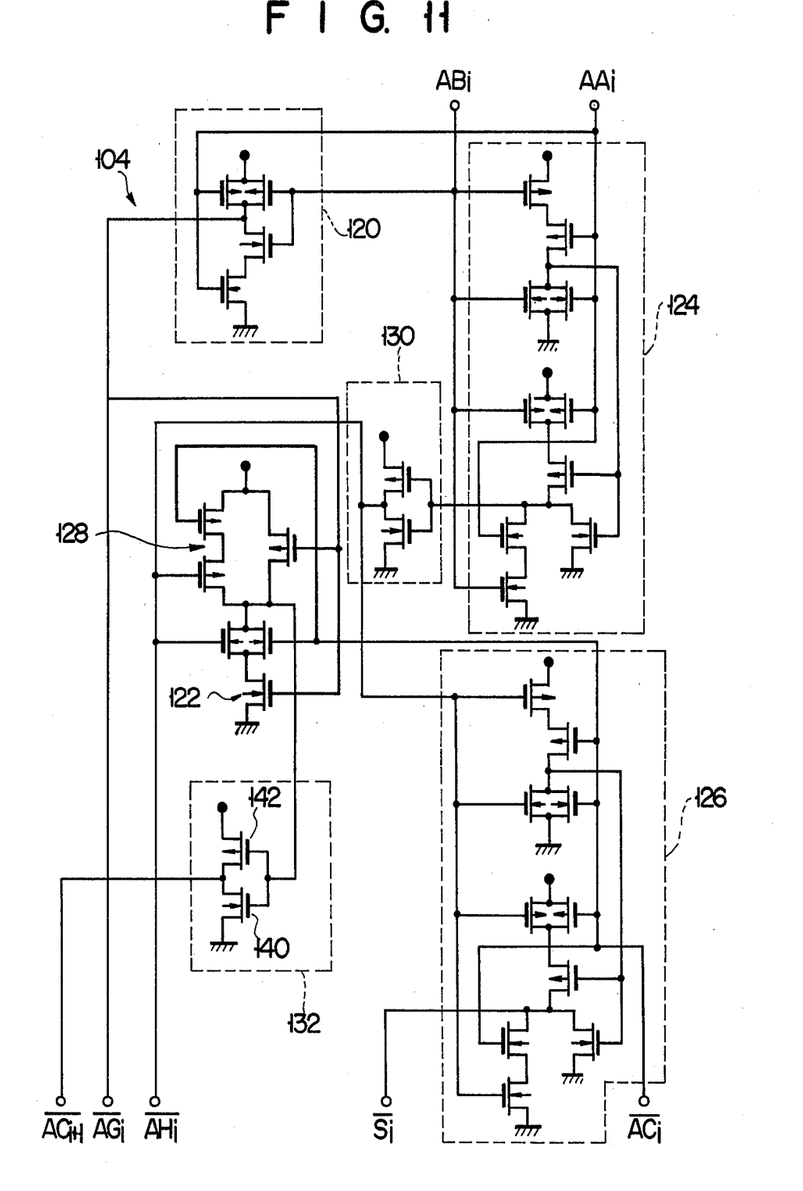
FIG. 11 is a circuit diagram of a detail of the adder which is shown in FIG. 8 and comprised of CMOS gates.

FIGS. 9 to 11 respectively show gate structures of the arithmetic cell 12, the carry circuits 30 and 32, and the adder 104. In FIG. 9, the arithmetic cell 12 is comprised of complementary metal-oxide-semiconductor (CMOS) gates. In the figure, reference numeral 140 designates an N channel enhancement type MOS transistor and numeral 142 designates a P channel enhancement type MOS transistor. The upper carry circuit 30 and the lower carry circuit 32 in the carry skip circuit 60 are comprised of E/D type MOS gates, as shown in FIG. 10. In the figure, reference numeral 144 designates an N channel depletion type MOS transistor. As shown in FIG. 11, the adder 104 is comprised of CMOS gates and the carry circuit 106 of the 16-bit parallel adder 50 including the adder 104 is comprised of the E/D type MOS gates, like the carry circuits 30 and 32 shown in FIG. 9.

The multiplication/division circuit thus constructed as an embodiment of the present invention performs an arithmetic operation in the following manner. In the multiplication mode, the arithmetic mode designating signal X supplied to the signal input terminal 26 (FIG. 1) is set at a logical "0" state. Accordingly, the eight numerical data $B_7, B_6, \ldots, B_0$ as the multiplicand are respectively supplied to the arithmetic cells 12 in the first arithmetic cell group 14-1.

At this time, the input data $A_i$ and $C_i$, as shown in FIGS. 3 and 9 as applied to the arithmetic cells of the first cell group 14-1 and the rightmost cells of the cell groups 14-2 to 14-8, are held in logical "0" state. Since the arithmetic mode designating signal X is held in logical "0" state, the eight numerical data $P_7, P_6, \ldots, P_0$ corresponding to the multiplier data are transferred to the most significant arithmetic cells of the first to eighth arithmetic cell groups 14-1 to 14-8 through the switch circuits 40, respectively. As a result, each arithmetic cell operates as a full-adder with three inputs, input data $A_i$, $C_i$ and $D_i \cdot B_i$, thus providing a carry output $C_{i+1}$ and a sum output $S_i$. Each arithmetic cell 12 holds a carry operation and produces data toward the succeeding arithmetic cell 12. Therefore, the 16-bit parallel adder 50 provided at the final stage produces final produce data $S=(S_{15}, S_{14}, \ldots, S_0)$ defined by the equation (3).

In a division mode, the arithmetic mode designating signal X supplied to the signal input terminal 26 (FIG. 1) is set in logical "1" state. Accordingly, in the 2-input EX-OR networks 22, there are provided data $\overline{B}=(\overline{B_7}, \overline{B_6}, \ldots, \overline{B_0})$ complementary to the logical "1" of the numerical data $B=(B_7, B_6, \ldots, B_0)$ corresponding to the divisor data. Those complement data B are supplied to the eight arithmetic cells of the first stage arithmetic cell group 14-1. At the same time, the numerical data $A=(A_{14}, A_{13}, \ldots, A_0)$ defined by the equation (4) are respectively supplied to the eight arithmetic cells 12 of the first arithmetic cell group 14-1, and the least significant arithmetic cells 12 in the second to eighth stage arithmetic cell groups 14-2 to 14-8. These two kinds of data are subjected to a division process according to the so called restoring technique.

In each row of the arithmetic cell array, a subtraction process which subtracts the divisor from the remainder or the dividend, is performed as an addition of the twos-complements of the divisor. At this time, the most significant bit of a certain arithmetic cell group changes its potential depending on as to whether an overflow or a carry output is present or not. When the outflow is present, the potential at the most significant bit is positive, while when it is not present, the potential is zero. Accordingly, the most significant bit is made to correspond to either of the logical value "1" or "0" of the quotient.

As already stated, since the arithmetic cell 12 is wired in accordance with the carry-save technique, not only the overflow in the present arithmetic cell group but also that in the preceeding arithmetic cell group must be included in the arithmetic operation of the present stage cell group. This is realized by the 4-input EX-OR networks 36 provided in the second to eighth stage arithmetic cell groups 14-2 to 14-8. The output data from the 2-input EX-OR network 34 and the 4-input EX-OR networks 36 are outputted as the quotient $(Q_7, Q_6, \ldots, Q_0)$ of the division and also are inputted to the cells at the same stage, through the switch circuits 40.

The data $e_i$, $e_{i+1}$, $G_{i+1}$ and $H_{i+1}$ (FIG. 3) are used when the arithmetic cell 12 in each of the arithmetic cell groups decides to include the overflow processing. The divisor $B_i$ of the i-th digit is used a 1's complement. For the addition of the 2's complements, the arithmetic mode designating signal X (=1) is applied to the input data $e_i$ corresponding to the least significant bit in each stage arithmetic cell group. The data $G_{i+1}$ and $H_{i+1}$ serve as a generation terms and a propagation terms in the carry processing. The addition of "1" to the least significant bit performed by the AND network of each stage cell group in the course of the subtraction processing when the quotient data is "1" is performed in the succeeding stage arithmetic cell group. As described above, the quotient data ($Q_7$, $Q_6$, ..., $Q_0$) is determined by every stage arithmetic cell group and the parallel adding circuit 50 provided at the final stage produces output data as the remainder data, $S = (S_{15}, S_{14}, \ldots, S_0)$.

In the arithmetic operation circuit, for example, the multiplication/division circuit 10, which is the embodiment of the present invention, the carry circuit sections 30 and 32 and the parallel adder 50 are constructed by E/D MOS gates. Therefore, a time delay in the arithmetic operation can be remarkably reduced compared with the prior art multiplication/division circuit which uses the CMOS gates for the whole circuit construction. Therefore, the operation speed is remarkably accelerated.

The reason why the above effects are attained will be discussed in detail hereinafter. Assuming that the number of bits of the multiplicand, the multiplication and the quotient is "n" which is a multiple of 4, the total operation time T for the multiplication/division circuit 10 is $$T = (n+1)T_1 + n(T_2 + T_3 + T_4) + T_5 + T_6 + (T_3' - T_3) \quad (14)$$

where
$T_1$: Delay time of the arithmetic cells 12
$T_2$: Delay time of the carry circuits 30 and 32
$T_3$: Delay time of the 4-input EX-OR network 36
$T_3'$: Delay time of the 2-input EX-OR network 34
$T_4$: Delay time of the switch circuits 40
$T_5$: Delay time of the 2-input EX-OR networks 22 connected to the first stage arithmetic cell group 14-1
$T_6$: Delay time of the parallel adder 50

In the equation (14), assume that the delay time of the CMOS gate is $T_C$ and the delay time of the E/D type MOS gate is $T_E$. It is further assumed that the total operation time of the multiplication/division circuit 10 is T and the total operation time of the prior multiplication/division circuit constructed by the CMOS gates is T'. The total equation time T of the multiplication/division circuit 10 according to the present invention will first be analyzed. The delay times in the equation (14) are rewritten into equations (15)

$$\left.\begin{array}{l} T_1 = 8T_C + 2T_E \cdot (n/4) \\ T_2 = 2T_E \cdot (n/4) \\ T_3 = 4T_C \\ T_3' = T_4 = T_5 = 2T_C \\ T_6 = 11T_C + 2T_E \cdot (n/4 - 1) \end{array}\right\} \quad (15)$$

Substituting the equations (15) into the equation (14), we have the following total operation time T $$T = T_C(14n + 19) + T_E(n + 2) \cdot (n - 1) \quad (16)$$

Similarly, the operating processing time of the prior circuit is given $$T' = T_C(14n + 19) + T_C(n + 2) \cdot (n - 1) \quad (17)$$

A ratio $\alpha$ of T' to T is $$\alpha = \frac{T}{T'} = \frac{T_C \cdot (14n + 19) + T_E(n + 2) \cdot (n - 1)}{T_C \cdot (14n + 19) + T_C(n + 2) \cdot (n - 1)} \quad (18)$$

$$= \frac{(14n + 19) + \dfrac{T_E}{T_C} \cdot (n^2 + n - 2)}{n^2 + 15n + 17}$$

A ratio of a delay time of the E/D type MOS gate to that of the CMOS type gate is generally $$T_E/T_C \approx \tfrac{1}{4} \quad (19)$$

Substituting the equation (18) into the equation (19), we have the ratio $\alpha$ as tabulated below when n (number of bits)=8 and 16.

TABLE II

| n | 8 | 16 |
|---|---|----|
| $\alpha$ | 0.83 | 0.74 |

When the number "n" of bit is 8, the total operation processing time of the multiplication/division circuit 10 which is the embodiment of the present invention is merely 83% of that T' of the prior circuit. The table also shows that when "n" is 16, it is further reduced to about 74%. It will be understood, therefore, that the embodiment of the present invention improves or accelerates the operation speed.

In the circuit of the embodiment according to the present invention, the carry section is comprised of the upper and lower carry circuits 30 and 32, and the carry processing relating to the arithmetic operation is performed in accordance with a carry skip operation. This further improves the operation speed of the circuit. Additionally, an area required for each element is small. Therefore, when the whole circuit is integrated, a high degree of integration is attained allowing a small chip area in the circuit fabrication.

Every arithmetic cell 12 is comprised of CMOS gates in the embodiment as mentioned above. Even where, therefore, the arithmetic operation circuit includes a large number of logic elements, only an extremely small amount of current has to flow through the arithmetic cells, assuring a reduction in the total power consumption.

Although the present invention has been shown and described with respect to a particular embodiment, nevertheless, various changes and modifications which are obvious to a person skilled in the art to which the invention pertains are deemed to lie within the spirit, scope, and contemplation of the invention. For example, the number of bits should be selected in accordance with a specification. In accordance with the number of bits selected, the arithmetic cells, etc, may be freely designed and the number of bits in the carry circuit and a carry technique may be properly selected. While the above-mentioned embodiment relates to the multiplication/division circuit 10, the present invention is of course applicable for other suitable operating circuits, for example, a division circuit and a circuit for extraction of the square root.

What is claimed is:

1. A circuit for performing arithmetic operations on at least one operand, said circuit comprising:
   a first number of arithmetic cell groups each corresponding to a different stage of said arithmetic operations circuit and each including a second number of cascade-connected arithmetic cells, said first and second numbers being related to the number of bits in said at least one operand, and each of said arithmetic cells including an adder consisting substantially of complementary MOS transistors and a carry signal output; and
   a plurality of carry circuits, each including two carry circuit means cascade-connected to each other and respectively connected to the carry signal output of a third number of cells and to said arithmetic cell groups for performing carry skip processing, each of said carry circuits consisting substantially of enhancement/depletion type MOS transistors.

2. A circuit according to claim 1 wherein said adder in each of said arithmetic cells comprises two NAND gates, two exclusive OR gates, two NOR gates, an OR gate, and two inverters, all of said gates and inverters being formed using complementary MOS transistors.

3. A circuit for performing multiplication and division operations on two operands, said circuit comprising:
   (a) 2n stages of first arithmetic cell groups each of which includes 2n cascade-connected arithmetic cells, where 2n is equal to the number of bits of one of said operands, each arithmetic cell having a carry signal output and an adder consisting substantially of complementary MOS transistors;
   (b) 4n carry circuits each including two carry circuit means cascade-connected to each other and respectively connected to the carry signal outputs of n arithmetic cells in each of said first arithmetic cell groups, said carry circuits performing carry skip processing and each of said carry circuits consisting substantially of enhancement/depletion type MOS transistors;
   (c) a second arithmetic cell group consisting of $2n-1$ arithmetic cells cascade-connected to each other and connected to the arithmetic cells corresponding to the most significant bit of said 2n stages of said first arithmetic cell groups, each of said arithmetic cells and said second arithmetic cell group including an adder consisting substantially of complementary MOS transistors; and
   (d) a parallel adder connected to the arithmetic cells of the 2n-th stage of first arithmetic cell groups and to said second arithmetic cell group, said parallel adder having at least one adder group including adders consisting substantially of complementary MOS transistors.

4. A multiplication and division circuit according to claim 3, wherein said parallel adder further includes a carry circuit connected to an output of said adder group and having gates consisting substantially of enhancement/depletion type MOS transistors.

5. A multiplication and division circuit according to claim 3, wherein said adder of each of said arithmetic cells contains means for performing a subtraction process contained in a division process as an addition of 2's complement by said adder.

6. A multiplication and division circuit according to claim 3, further comprising an input terminal to which an arithmetic operation mode designating signal is inputted for selectively designating one of a multiplication mode and a division mode.

7. A multiplication and division circuit according to claim 6, wherein said arithmetic operation mode designating signal is a digital signal changing between logic "1" state and logic "0" state.

* * * * *